Nov. 10, 1942.  R. F. IVERSON  2,301,877
BRAKE MECHANISM
Filed July 3, 1939
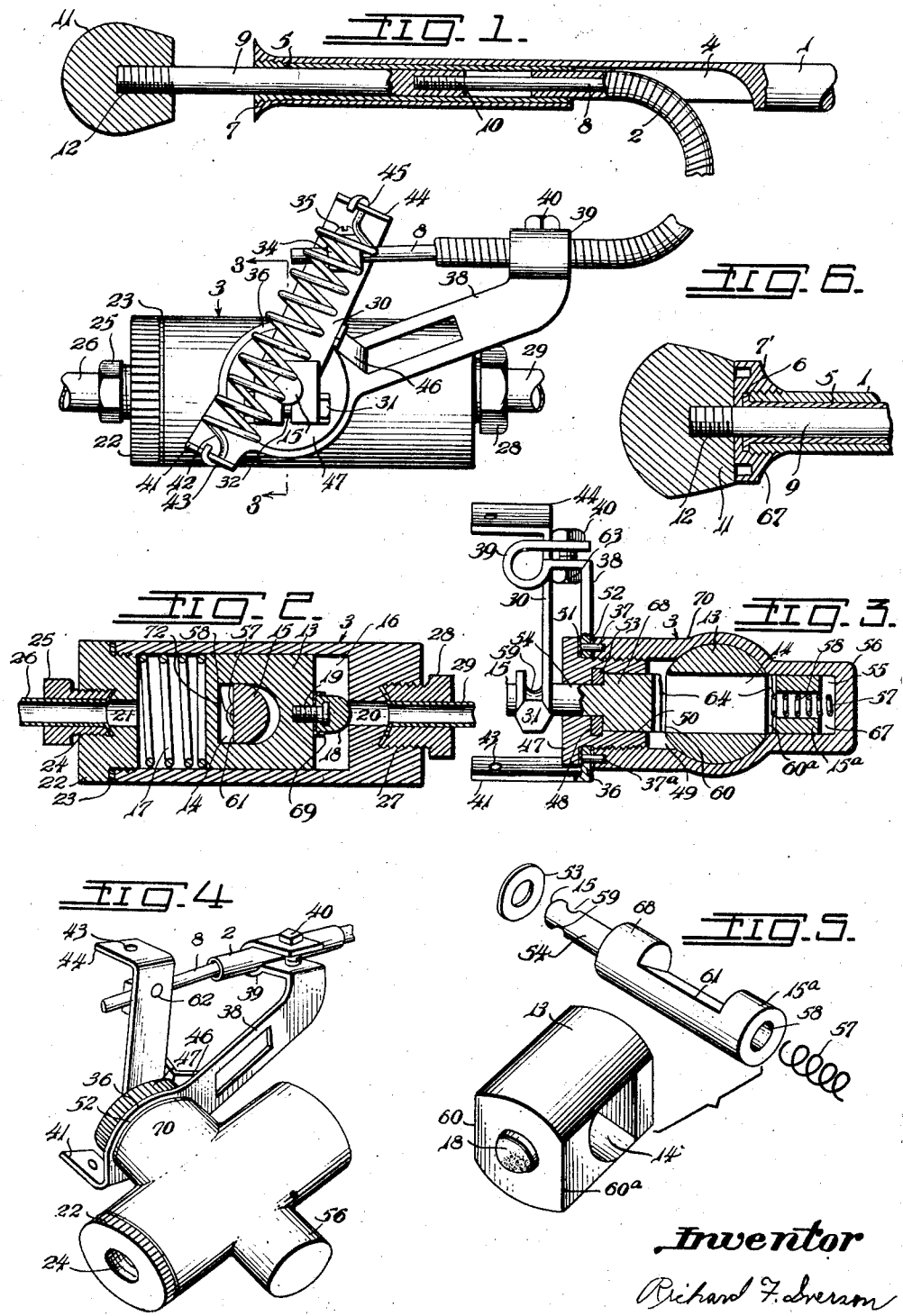
Inventor
Richard F. Iverson Patented Nov. 10, 1942

2,301,877

UNITED STATES PATENT OFFICE 2,301,877

BRAKE MECHANISM

Richard Frederick Iverson, New York, N. Y.

Application July 3, 1939, Serial No. 282,755

3 Claims. (Cl. 188—152)

This invention relates to brake mechanisms and especially to the kind adapted to hold automobile brakes in applied position during temporary stops of the vehicle such as are occasioned by heavy traffic on the highways and by changing traffic lights in congested areas.

It is a major object of this invention to provide means whereby the brakes of automobiles may be held in applied position during temporary stops without the need for maintaining foot pressure against the brake pedal or for applying the hand or emergency brake.

Another object of the invention is to provide means of the kind whereby the desired result may be obtained with a minimum of movement and effort on the part of the operator.

It is also an object of the present invention to provide means of the kind that is operative only at the will and discretion of the operator, and which will at no other time be affected by or affect the operation, performance, or running of the car.

Other objects, advantages, and features of the invention will become apparent in the course of the following description of the embodiment of my invention shown in the accompanying drawing in which:

Fig. 1 is a side view, partly in section, showing the relationship of the main parts of my invention to each other;

Fig. 2 is a vertical longitudinal sectional view of the valve mechanism shown in Fig. 1;

Fig. 3 is a cross-sectional view of the same mechanism taken along the line 3—3 of Fig. 2;

Fig. 4 is a perspective view of the same mechanism illustrated in Figs. 2 and 3;

Fig. 5 is an elevational view of parts contained in Figs. 2 and 3;

Fig. 6 is a sectional view of a modified structure of the gear-shift lever assembly.

In order to facilitate a fuller and clearer understanding of my invention, a detailed description of the embodiment herein illustrated follows.

With reference to the drawing, the numeral 1 denotes a gear-shift lever, particularly of the type adapted to be mounted on the steering column of automobiles, which has incorporated in its construction means whereby push and pull movement may be imparted to the gear-shift ball 11 thereof and transmitted to a valve mechanism 3 mounted in the hydraulic fluid line of a vehicle between the master cylinder and the wheel brake cylinders (not shown in the drawing), and which is designed to control the flow of fluid thru a port 20 in said line.

In the embodiment of my invention shown in the drawing, the lever 1 is provided with a bore 4 which receives the ferrule 5, said ferrule being attached to member 1 by means of threads as at 7. To the opposite end of the ferrule 5 is attached a flexible cable 2 which extends to the valve mechanism and is attached to it by means of the clamp 39 and bolt 40.

Within the passageway formed by the ferrule 5 is an elongated member 9 to which is attached as at 12 the gear-shift ball 11, said elongated member being capable of reciprocal movement within the passageway. Attached to the other end of the elongated member 9 is a flexible wire lead 8 that extends thru cable 2 to the valve mechanism and is attached to it by means of the swivel connection 34.

A casing which carries the valve mechanism is denoted by the numeral 3. It is provided with a longitudinal chamber 16 which receives the valve-bearing member 13, said valve-bearing member being free to move reciprocably within said chamber 16.

A valve 18, designed and positioned to close the port 20 in the hydraulic fluid line 29 from the master cylinder, is attached to the valve-bearing member 13 at the radial center of its forward face by means of the threaded member 19 and the collar 69. If desired the valve may be countersunk in a recess in the face of member 13, thereby eliminating the collar 69. It is to be noted that valve 18, when seated, serves as a one-way check valve and permits application, but not release of the brakes.

The valve-bearing member 13 is also provided with a slot 14 which extends thru the member from side to side and which receives the shaft 15. A tension spring 17 is disposed in the chamber 16 and constantly exerts pressure against member 13, thus maintaining contact of that member with the shaft 15 at all times except when the valve is in closed position as shown in Figs. 2 and 3. A screw cap 22 closes chamber 16, and a gasket 23 seals the union against leakage.

The shaft 15 is provided with the plane cam surface 61 which is designed to coact with the rear wall surface 72 defined by the slot 14.

It will be noted that the sides of member 13 are cut away as at 60 and 60a in order to provide by-passes 64.

The end 15a of the shaft 15, it will be noted, fits into a bore 55 of the extension 56 of the casing 3. It will also be noted that the portion 68 of shaft 15 fits into an identical bore 50 of the screw cap 47 and that the extending portion 54 of said member 15 is of smaller diameter than portions 68 and 15a, forming a shoulder 53 which abuts against the washer 48. A tension spring 57, disposed in hole 58 of member 15, abuts against said member thereby maintaining contact of the part against the washer and preventing leakage of fluid thru the opening in the screw cap 47 thru which projects the extending portion 54 of the member 15.

The valve parts described above are maintained in assembled relation by the screw cap 47 which threads into the bore 49 of the extension 70 of the casing 3.

A bracket 36, an extension of which 38 forms the clamp 39, is likewise held in assembled relation to other parts of the valve mechanism by the screw cap 47. Dowels 37 and 37a prevent accidental rotary movement of the bracket, and gaskets 51 and 52 seal against leakage around the part.

A lever 30 bearing the swivel to which is attached the flexible wire lead 8 as previously mentioned is attached to the extending end 54 of the shaft 15 by means of bolt and nut 31.

To counter-act the tension of spring 17 and in order to hold the valve mechanism in off position while the device is inoperative a pull-back spring 42 is attached to the extension 41 of the bracket 36, the other end thereof being attached to the extension 44 of the lever 30 substantially as shown in Fig. 1.

A portion of the bracket 36 is formed to provide the back-stop 46 for the lever 30 in order to prevent movement of the part beyond applied position illustrated in the drawing.

With reference to Fig. 6 which shows a modified construction of the gear-shift assembly of my device, the ferrule 5 herein is provided with the flange 6 and is held in position in respect to member 1 by the threaded member 7', said member 7' providing the finger-grip surface 67 to facilitate operation of the mechanism.

Although to permit a fuller understanding of the matter of the present invention a specific embodiment thereof has been hereinbefore described and illustrated, it is to be understood that this embodiment has been shown purely by way of example and is non-limitive. It will be apparent that the embodiment of the invention shown and described herein is susceptible to modification and change without departing from the spirit thereof.

Having described the features of construction and assembly of my invention, I shall now describe the operation thereof.

Ordinarily when a car is being brought to a stop, the driver applies the foot brake until the vehicle comes to a standstill and then, or a few seconds before, disengages the clutch and gear-shift lever. If the car is on an incline it will be necessary to keep the foot brake depressed or to apply the hand brake for the duration of the stop. In a car equipped with my device the driver simply pulls out the gear-shift ball at the time he shifts the lever in neutral position when the car comes to a standstill. The driver may then remove his foot from the brake pedal and place it on the accelerator pedal preparatory to the resumption of travel. To release the brakes when it is desired to resume movement of the vehicle it is only necessary to push the gear shift ball in to normal or driving position as the shift from neutral to first gear is made.

Drawing out of the gear-shift ball 11 moves lever 30 from off position to on position shown in Fig. 1, thereby imparting clock-wise rotary motion to the shaft 15, moving the cam surface 61 from a horizontal to the vertical position shown, permitting valve-bearing member 13 to move forward by virtue of tension of spring 17 thereby interposing valve 18 in the port 20 and preventing return of hydraulic fluid from the brake cylinders to the master cylinder. Hydraulic pressure plus tension of the spring 17 maintains the valve in closed position, when the operator removes his foot from the brake pedal.

What I claim is:

1. In combination with the gear shift lever assembly of an automobile, an auxiliary brake control comprising a control cylinder mounted in the brake fluid line of the car and means for manually actuating mechanism in the control cylinder to set and to maintain the brakes in applied position and to release them, said means comprising an operating handle which also forms the handle of the gear shift lever and is an integral part of the gear shift lever assembly, a shaft member to which the operating handle is attached and which is disposed within the gear shift lever and is slidable longitudinally thereof, and connecting means between the shaft member and the control cylinder, the actuating means being arranged to set the brakes in applied position by movement of the operating handle away from the point of contact with respect to the gear shift lever, and to release the brakes by movement of the operating handle toward the point of contact with respect to the gear shift lever, and said gear shift lever being provided with a flange at its outer end said flange being of a size at least as great as the inner end of the operating handle at the point of contact, the operating handle and the end of the gear shift lever being in form and in relationship to give visible indication of the position of the handle when it is away from the point of contact with respect to the gear shift lever.

2. In combination with a gear shift lever assembly of an automobile, an auxiliary brake control comprising a control cylinder mounted in the brake fluid line of the car and means for manually actuating mechanism in the control cylinder to set and to maintain the brakes in applied position and to release them, said means comprising an operating handle which also forms the handle of the gear shift lever and is an integral part of the gear shift lever assembly, a shaft member to which the operating handle is attached and which is disposed within the gear shift lever and is slidable longitudinally thereof, and connecting means between the shaft and the control cylinder said connecting means being the sole connection of actuating means to the control cylinder mechanism, the actuating means being arranged to set the brakes in applied position by movement of the operating handle away from the point of contact with respect to the gear shift lever, and to release the brakes by movement of the operating handle toward the point of contact with respect to the gear shift lever, and said gear shift lever being provided with a flange at its outer end said flange being of a size at least as great as the inner end of the operating handle at the point of contact, the operating handle and the end of the gear shift lever being of such form and in such relationship as to give visible indication of the position of the handle when it is away from the point of contact with respect to the gear shift lever.

3. In combination with the gear shift lever assembly of an automobile, an auxiliary brake control comprising a control cylinder mounted in the brake fluid line of the car and means for manually actuating mechanism in the control cylinder to set and to maintain the brakes in applied position and to release them, said means comprising an operating handle which also forms the handle of the gear shift lever and is an integral part of the gear shift lever assembly, a shaft member to which the operating handle is attached and which is disposed within the gear shift lever and is slidable longitudinally thereof, and connecting means between the shaft member and the control cylinder said connecting means being the sole connection of actuating means to the control cylinder mechanism, the actuating means being arranged to set the brakes in applied position by movement of the operating handle away from the point of contact with respect to the gear shift lever, and to release the brakes by movement of the operating handle toward the point of contact with respect to the gear shift lever, the brakes being maintained in applied position between the setting and releasing thereof by the back pressure of trapped brake fluid against a check valve in the control cylinder, and said gear shift lever being provided with a flange at its outer end said flange being of a size at least as great as the inner end of the operating handle at the point of contact, the operating handle and the end of the gear shift lever being of such form and in such relationship as to give visible indication of the position of the handle when it is away from the point of contact with respect to the gear shift lever.

RICHARD FREDERICK IVERSON.